INVENTOR.
HILLEL WEINSTEIN
BY
Samuel Cohen
Attorney

INVENTOR.
HILLEL WEINSTEIN
BY
Samuel Cohen
Attorney

INVENTOR.
HILLEL WEINSTEIN
BY Samuel Cohen
Attorney

Aug. 2, 1966 H. WEINSTEIN 3,264,624

SYSTEM FOR THE RETRIEVAL OF INFORMATION FROM A CONTENT ADDRESSED MEMORY AND LOGIC NETWORKS THEREIN

Filed July 30, 1962 4 Sheets-Sheet 4

INVENTOR.
HILLEL WEINSTEIN
BY Samuel Cole
Attorney

United States Patent Office 3,264,624

Patented August 2, 1966

3,264,624

SYSTEM FOR THE RETRIEVAL OF INFORMATION FROM A CONTENT ADDRESSED MEMORY AND LOGIC NETWORKS THEREIN

Hillel Weinstein, New York, N.Y., assignor to Radio Corporation of America, a corporation of Delaware Filed July 30, 1962, Ser. No. 213,339
9 Claims. (Cl. 340—172.5)

The present invention, in its broader context, relates to the problem of determining the number of bits of a given value in a group of N binary bits. The solution to this problem is of importance in a number of data processing applications. As one example, the invention is discussed in detail below in terms of the problem of retrieving from a "content addressed" (sometimes also known as an "associative" or "catalog") memory system more than one item of information (more than one word) associated with a given "tag" word.

The content addressed memory discussed below includes a matrix of memory elements arranged in columns and rows. Each row in the memory stores a word. The diode memory chosen to illustrate the invention is a permanent memory, that is, the contents of the memory cannot easily be changed. It is to be understood, however, that the invention is equally applicable to non-permanent memories as, for example, transfluxor or cryoelectric content addressed memories. It is also applicable to permanent content addressed memories in which the memory elements are capacitors, resistors, or the like rather than diodes.

A content addressed memory is interrogated by applying the bit or bits of a "tag" word, sometimes also known as a "descriptor," to a column or columns of the memory. There may be one or more words in the memory which correspond to the tag word. A memory word is said to correspond to or to be called for by a tag word when the bits in the memory word which are in the columns to which the bits of the tag word are applied are respectively equal to the bits of the tag word.

One aspect of the present invention is the solution to the problem of retrieving from a content addressed memory all of the words corresponding to the tag word, and in addition, doing this in an order related to the addresses in the memory at which the words are stored. This is done, not as in the prior art, in which the successive memory addresses are interrogated in sequence, regardless of whether or not a word corresponding to the tag word is stored at each address. Nor is a special programming technique required. Instead, only $q$ passes are required to extract all words from the memory regardless of the memory size and regardless of the length of each word, where $q$ is the number of words in the memory corresponding to the tag word.

The system for retrieving words includes a plurality of memory devices for storing the bits of a parallel binary word, the parallel binary word indicating the rows in the memory storing words corresponding to the tag word. A first multiple path network, including signal responsive means for producing control signals, is connected to said memory devices. A second multiple path network, including gate means in each said path responsive to said control signals, produces one output pulse in response to the storage by any of the memory devices of a binary bit of given value. This output pulse initiates the readout of a word from a row in the memory. The second network also removes a binary bit of given value from the one of the devices corresponding to the row readout. The process of producing control signals and reading out a row is repeated until all of the words in the memory corresponding to the tag word are read out.

The invention is discussed in greater detail below and is illustrated in the following drawings of which:

FIGURES 1*a*–1*f* are diagrams to explain symbols employed in FIGURES 2 and 3;

Similar reference numerals are applied to similar elements throughout the figures.

A number of blocks shown in the figures represent known circuits. The circuits of these blocks are actuated by electrical signals applied to the blocks. When a signal is at one level, it represents the binary digit "one" and when it is at another level, it represents the binary digit "zero." For the sake of the discussion which follows, it is arbitarily assumed that a positive signal of greater than given magnitude represents the binary digit "one" and a negative signal of greater than a given magnitude represents the binary digit "zero." Also, to simplify the discussion, rather than speaking of an electrical signal being applied to a block or logic stage, it is sometimes stated that a "one" or a "zero" is applied to the block or logic stage.

Throughout the figures capital letters are used to represent signals indicative of binary digits. For example, X may represent the binary digit "zero" or the binary digit "one." $\overline{X}$ represents the complement of X.

Figure 1A:
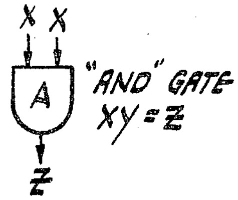
Figure 1B:
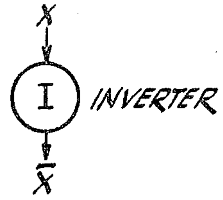
Figure 1C:
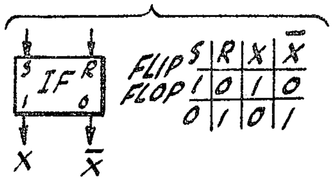
Figure 1D:
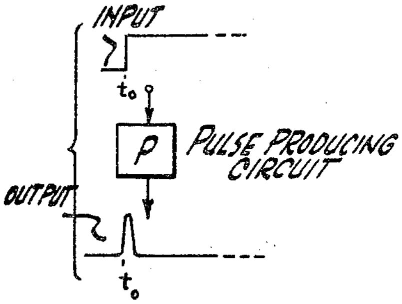
Figure 1E:
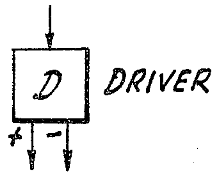
Figure 1F:
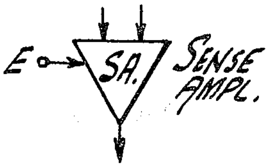

FIGS. 1*a*–1*f* show the symbols employed for elementary circuit elements in various other figures. For example, FIG. 1*a* shows an AND gate. FIG. 1*c* shows a flip-flop. S and R are the set and reset terminals, respectively. The truth table for the flip-flop is to the right of the diode. FIG. 1*d* shows a pulse producing circuit which, for example, may be a differentiating circuit. FIG. 1*f* shows a sense amplifier. The sense amplifier is inoperative in the absence of an enabling signal E applied to terminal 9 of the amplifier. FIG. 1*e* is a driver. The driver may have one or more outputs. In the case of a 2 output driver, a positive pulse may be produced at one output terminal and negative pulse at the other output terminal.

Figure 2:
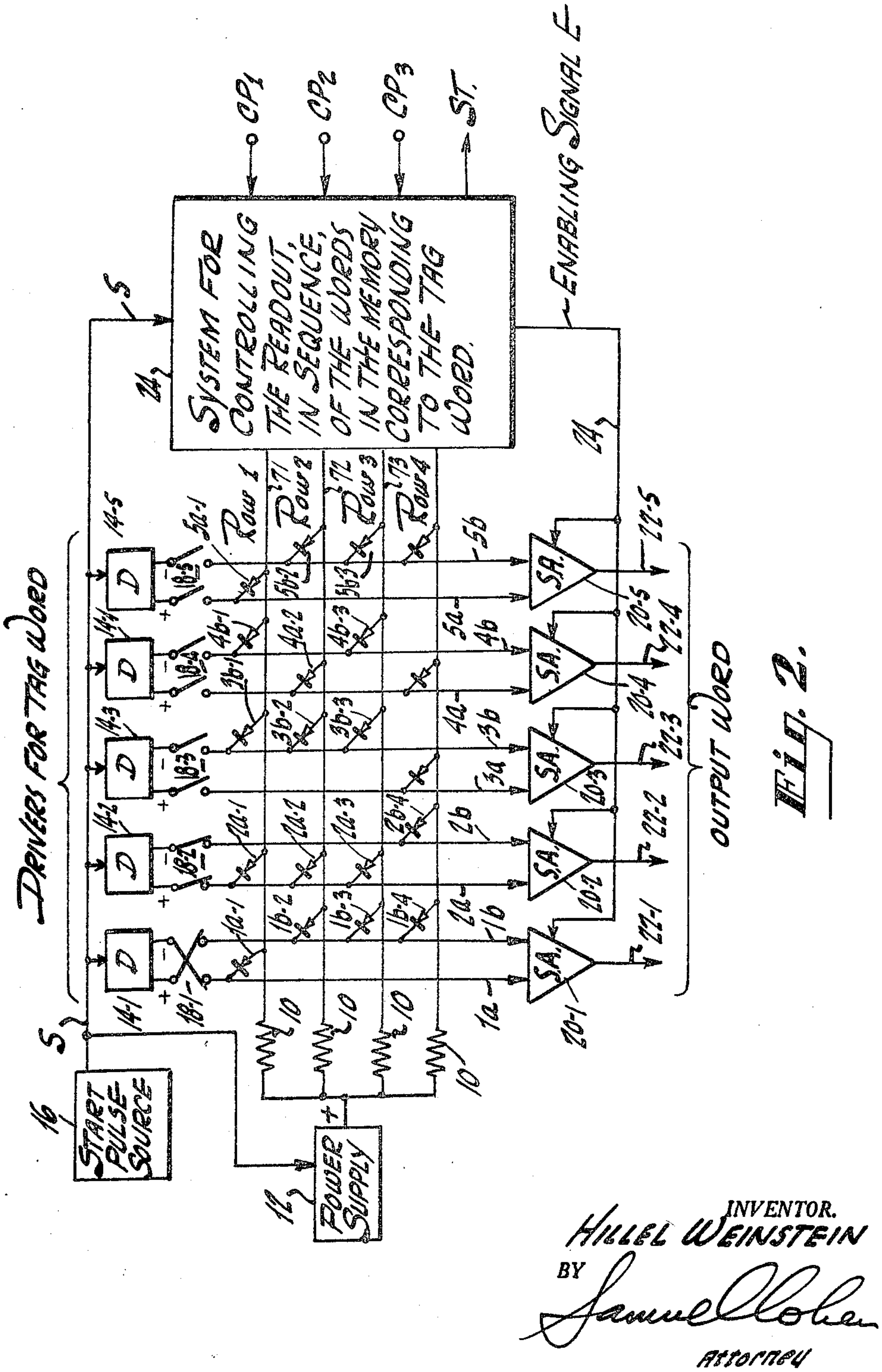
FIGURE 2 is a block and schematic circuit diagram of a content addressed memory system according to the present invention.

The content addressed memory illustrated in FIGURE 2 is arranged in columns and rows. It is arbitrarily assumed that each row stores a word. Each column consists of two wires. The left wire is legended the *a* wire and the right wire the *b* wire.

There is a driver 14 associated with each column. The five drivers shown are legended 14–1 through 14–5, respectively. Each driver has two output terminals. A positive voltage appears at the left output terminal and a negative voltage at the right output terminal when the driver is active. The driver is rendered active when a start pulse S is applied to the driver from start pulse source 16.

The drivers may be connected to or disconnected from their respective columns by switches, shown in FIGURE 2 as mechanical switches 18. In practice, electronic switches such as transistors, diodes or the like may be employed instead of the mechanical switches. The switches are of reversible polarity so that a positive voltage can be applied to the *a* column wire and a negative voltage to the *b* column wire or vice versa. In FIGURE 2, only two of the drivers, namely, 14–1 and 14–2 are connected to their columns by switches. Therefore, the tag word consists of only two bits in this example. It is to be understood, however, that the tag word can include any number of bits up to the total number of bits in a word—five bits in the memory chosen for illustration.

The memory of FIGURE 2 is interrogated by driving selected columns. A column is driven by a "1" by applying a "1" to the *a* wire and a "0" to the *b* wire. A column is driven by a "0" by applying a "0" to the *a* wire and a "1" to the *b* wire.

A word may be read out of the memory by the sense amplifiers 20–1 through 20–5. These amplifiers are normally inactive. However, in response to an enabling signal E they produce a positive or negative output depending on the voltages present on the *a* and *b* leads. When the bit sensed in a column is a "1," 1, 0 (a "1" on the *a* wire and a "0" on the *b* wire) is sensed in that column and the sense amplifier produces a "1" output (a positive voltage) on its output lead 22. When the bit sensed in a column is a "0," 0, 1 (a "0" on the *a* wire and a "1" on the *b* wire) is sensed in that column and a "0" output (a negative voltage) appears on the output 22. The amplifiers are conventional. They may each include a transistor which is connected to receive the *a* and *b* signals across its emitter to base diode is a sense to forward bias the transistor when a "1" is sensed and to reverse the transistor when a "0" is sensed. The voltage normally present on the enabling lead 24 may be such as to normally maintain the transistor cut-off and to place the transistor in condition to conduct when the pulse E is present.

A stored "word" is defined here as all or part of the information stored in one line of the memory. The number of bits or characters in a word will depend, of course, on the number of columns in the memory. In the event that this word is relatively long and corresponds, for example, to complete sentences or to a complete set of data describing, for example, a medical history, or the name, address, policy number, premium due date of a policyholder, such word is sometimes referred to in this art as a "message." However, in the present application, the term "word" is used throughout to avoid any ambiguity between the description of the readout of one line of information (which may have many items of information) and several lines of information. In other words, in the present application, when it is stated that more than one word is read out of the memory, it is to be understood that the contents of more than one line of the memory is read out.

The content addressed memory shown in FIGURE 2 has four rows and five columns. In practice, the memory may be much larger than this but the smaller size memory illustrated for purposes of explanation. At each place in the memory where a column intersects a row, a diode is connected either from the *a* column to the row lead (to represent storage of the binary bit "1") or the *b* column to the row lead (to represent storage of the binary bit "0") but not from both the *a* and *b* columns to the row lead. The diodes are identified by the legend $\alpha$–$\beta$ where $\alpha$ refers to the column and $\beta$ refers to the row. For example, there is a diode connected by the column 1*a* and row 1 and this diode is legended 1*a*–1. In this example, the anode is always connected to the row lead, however, with reversed polarity power supply connections the diodes will be connected in the opposite sense.

All of the row leads in the memory are connected through resistors 10 to a common power supply 12. This power supply is normally inactive. However, in response to a start pulse S, the power supply applies a positive voltage pulse to terminal 13.

The operation of the memory system of FIGURE 2 is discussed by way of a particular example. In this example, the drivers 14–3, 14–4 and 14–5 are disconnected from their column leads. The driver 14–1 is connected to apply a "0" to its column (a negative voltage to column 1*a* and a positive voltage to column 1*b*) and the driver 14–2 is connected to apply a "1" to its column (a positive voltage to column wire 2*a* and a negative voltage to column wire 2*b*).

Upon receipt of the start signal S, the power supply applies a positive voltage to the common terminal connected to resistors 10. At the same time, the drivers 14–1 and 14–2 apply (0, 1) and (1, 0) to their respective columns. The 0, 1 applied to column 1 causes diode 1*a*–1 to conduct so that the row 1 line assumes a negative value of voltage. The 1, 0 applied to column 2 causes diode 2*b*–4 to conduct so that row 4 assumes a negative value of voltage. None of the diodes 1*b*–2, 1*b*–3, 2*a*–2 or 2*a*–3 conduct since the positive voltages applied by the drivers to the 1*b* and 2*a* lines reverse bias these diodes. Therefore, rows 2 and 3 assume a positive value of voltage. This indicates that there are two words in the memory, namely the words stored in rows 2 and 3, which correspond to the tag word.

The system shown generally in block 24 of FIGURE 2 is the means for reading out words in the memory corresponding to the tag word in sequence and in a relatively short interval of time. Details of this block appear in FIGURE 3 which should now be referred to. The row leads are shown at the left of the figure. These leads are connected through AND gates 30*a* through 30*d* to the set terminals of flip-flops 32*a*–32*d*, respectively. The purpose of flip-flops 32 is to temporarily store the information appearing on the row leads.

The 0 output terminals of the flip-flops are connected through pulse producing circuits 34*a*–34*d*, respectively, to the set input terminals of flip-flops 36*a*–36*d*, respectively. The pulse producing circuits 34 also apply their outputs to the respective input leads 38*a*–38*d* of a convergent tree network. The transistors 40*a*–40*d* and 41*a*–41*b* in the convergent tree, that is the convergent tree network or circuit, are for the purpose of insuring unidirectional current flow. Also, the transistors standardize the current flow in the various branches.

A transistor, such as 40*a*, is connected at its base through the set terminal of flip-flop 36 to a low impedance path to ground. For example, in the case in which the flip-flop is a transistor flip-flop, the low impedance path may be the emitter to base diode of one of the transistors in the flip-flop. In a similar manner, the emitter of the transistor is connected through a low impedance path in flip-flop 44*a* to ground. Therefore, in the absence of a positive signal at the base electrode (at lead 38*a*, for example) the transistor does not conduct, even though its collector is connected to a positive voltage source (+10 volts, for example). When a positive pulse is applied to the base of a transistor such as 40*a*, it is driven to saturation and the emitter to collector current sets the following flip-flop 44*a* and also causes the following transistor (such as 41*a*) to conduct. The other transistors are connected in a similar manner.

Branches 38*a* and 38*b* converge to branch 42*a* and branches 38*c* and 38*d* converge to branch 42*b*. Branch 42*a* is connected to the set terminal of flip-flop 44*a* and branch 42*b* is connected to the set terminal of flip-flop 44*b*. Branches 42*a* and 42*b* converge to branch 46 which is connected to the set terminal of flip-flop 82. The 1 output terminal of flip-flop 82 is connected to one of the input terminals to AND gate 48. AND gate 48 is the start of a divergent tree.

The divergent tree network includes branch 50 which diverges to branches 52*a* and 52*b*. Branch 52*a* serves as one input to AND gate 54*a* and branch 52*b* serves as one input to AND gate 54*b*. The output of AND gate 54*a* is applied to divergent branches 56*a* and 56*b* and the output of AND gate 54*b* is applied to divergent branches 56*c* and 56*d*. Branches 56*a*–56*d* serve as an input to AND gates 58*a*–58*d*, respectively. The respective outputs of these four AND gates, namely $E_1$–$E_4$ are applied to an OR gate 58 shown at the lower right of the figure and to other places in the circuit.

AND gates *60a–60d* are respectively connected between the pulse circuits *62a–62d* and the respective set terminals of flip-flops *32a–32d*. AND gate *63a* receives the 0 output of flip-flop *36a* and the 1 output of flip-flop *36b*. AND gate *63b* receives the 0 output of flip-flop *36c* and the 1 output of flip-flop *36d*.

Figure 3:
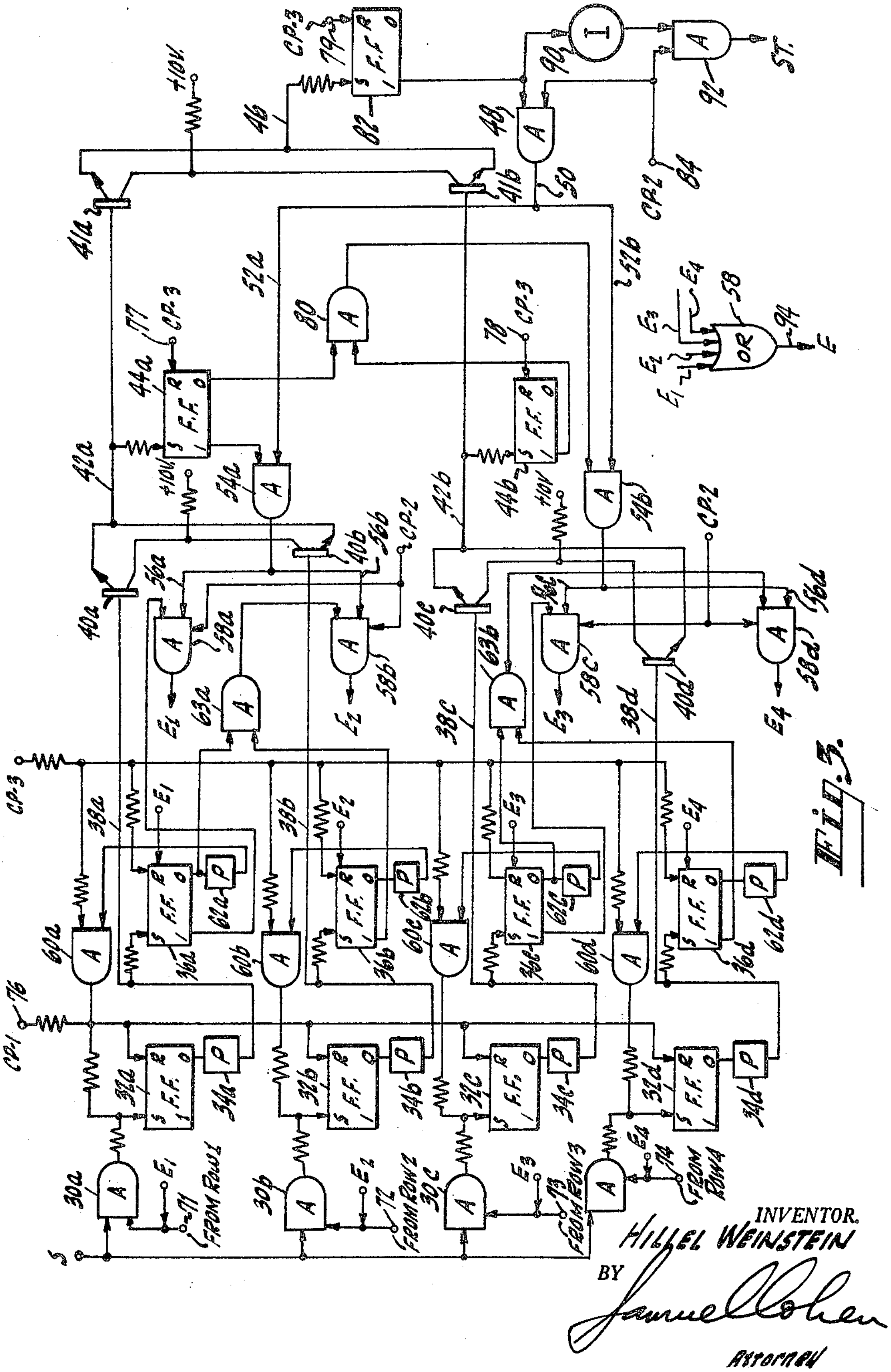
FIGURE 3 is a block and schematic diagram showing the convergent and divergent tree networks which are illustrated by a single block in FIGURE 2.

In the operation of the system of FIGURE 3, it may be assumed that when a start pulse S occurs, the row 2 and row 3 input terminals 72 and 73, respectively, carry a positive voltage indicative of the binary bit "1" and the row 1 and row 4 input terminals 71 and 74, respectively, carry a negative voltage indicative of the binary bit "0." It may also be assumed that all of the flip-flops shown in FIGURE 3 are initially in a reset condition. These flip-flops may be reset by a general reset pulse (not shown) from the control area of the data processing machine (not shown) applied to the reset terminals of all flip-flops. However, it will shortly be shown that upon completion of the readout of all words in the memory, all flip-flops are reset even in the absence of a general reset pulse.

To start the readout of the memory, a start pulse S is applied to the drivers 14 of FIGURE 2, the power supply 12 of FIGURE 2, and the AND gates 30 of FIGURE 3. This start pulse together with the "ones" which occur at terminals 72 and 73 in response to the start pulse, enable the AND gates *30b* and *30c* and the outputs of these gates set flip-flops *32b* and *32c*, respectively. AND gates *30a* and *30d* each receive one "1" input and one "0" input so that these gates remain disabled. Accordingly, flip-flops *32a* and *32d* remain reset.

Figure 4:
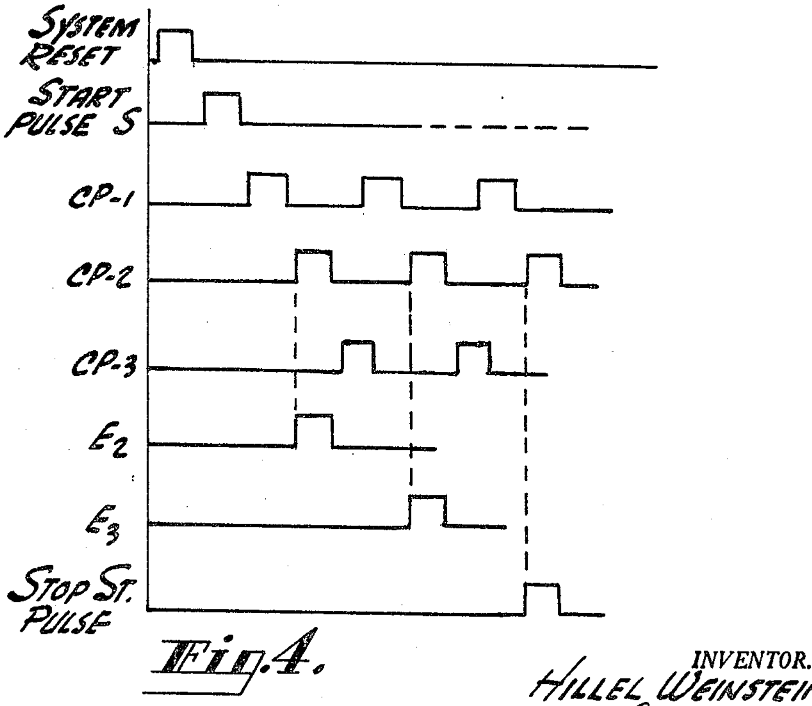
FIGURE 4 is a drawing of waveforms to help explain the operation of the system of the invention.

Upon termination of the start pulse S, the first control pulse CP–1 is applied to input terminal 76. The relative timing of this pulse and the others to be discussed is shown in FIGURE 4. Control pulse CP–1 resets flip-flops *32b* and *32c*. Resetting of flip-flops *32b* and *32c* causes the pulse producing circuits *34b* and *34c* to set flip-flops *36b* and *36c*. Pulse producing circuits *34a* and *34d* do not produce output pulses as their flip-flops *32a* and *32d* are already in a reset condition when the control pulse CP–1 is applied to the reset terminals of these flip-flops.

The pulse produced by circuits *34b* and *34c* is also applied to the input branches *38b* and *38c* of the convergent tree. The pulse on branch *38b* passes through transistor *40b* and sets flip-flop *44a*, via the current steered into the flip-flop. The pulse present on branch *38c* passes through transistor *40c* and sets flip-flop *44b*. The "1" present at the 1 output terminal of flip-flop *44a* primes AND gate *54a*. The "0" present at the 0 output terminal of flip-flop *44a* disables AND gate 80. Disabled AND gate 80 maintains AND gate *54b* disabled. The pulses present on branches *42a* and *42b* pass through diode 41 and set flip-flop 82. The "1" present at the 1 output terminal of flip-flop 82 now primes AND gate 48.

The next timing pulse CP–2 is applied from input terminal 84 to primed AND gate 48. This AND gate therefore produces an output pulse on branch 50 which goes to divergent branches *52a* and *52b*. AND gate *54b* is disabled so that the pulse present on branch *52b* does not pass through this AND gate. AND gate *54a*, however, is primed and it produces an output pulse which is applied via branches *56a* and *56b*, to AND gates *58a* and *58b*. AND gate *58a* is disabled by the "0" appearing at the 1 output lead of flip-flop *36a*. However, AND gate *63a*, which is connected to the 0 and 1 output terminals respectively of flip-flops *36a* and *36b*, is enabled and its output primes AND gate *58b*. The third input to AND gate *58b* is the clock pulse CP–2 so that AND gate *58b* produces a "one" output pulse $E_2$. This "1" output pulse is applied through OR gate 58 to the sense amplifiers 20 of FIGURE 2 placing these sense amplifiers in condition to conduct. At the same time, the pulse $E_2$ is applied to the row 2 line 72 making this row line positive. Accordingly, all of the diodes connected to the row 2 line 72 conduct and the word stored on this line is read out by the sense amplifiers 20. This word is 0 1 0 1 0 and it may be applied to the register of a buffer storage system (not shown) or to other circuits (not shown) in the data processing machine.

The output pulse $E_2$ from AND gate *58b* is also applied as a reset signal to flip-flop *36b*. Upon application of the pulse $E_2$ and the resetting of the flip-flop *36b*, the pulse circuit *62b* produces an output pulse. However, during the interval of control pulse CP–2, AND gate *60b* is disabled so that the pulse produced by circuit *62b* cannot pass through AND gate *60b*. The application of the pulse $E_2$ to flip-flop *36b* therefore essentially erases the information temporarily stored in this flip-flop.

The next control pulse CP–3 is applied as a reset pulse to flip-flops *44a*, *44b*, 82 and all the flip-flops 36. Of these latter flip-flops, only flip-flop 36 is in a set condition so that only the pulse producing circuit *62c* produces an output. Control pulse CP–3 is applied also as a priming signal to AND gate *60c* so that the pulse produced by circuit *62c* passes through AND gate *60c* and sets flip-flop *32c*. Flip-flops *32a*, *32b* and *32d* remain in a reset condition.

Control pulse CP–3 completes one readout cycle. The next control pulse CP–1 is applied as a reset signal to flip-flop 32. Of these flip-flops, only flip-flop *32c* is set so that only pulse circuit *34c* produces an output. This output is applied as a set signal to flip-flop *36c*. The other flip-flops *36a*, *36b* and *36d* remain reset.

The pulse produced by circuit *34c* is applied via branch *38c* and transistor *40c* to the set input terminal of flip-flop *44b*. Flip-flop *44a*, which was reset by control pulse CP–3 of the previous cycle, remains in this reset condition so that AND gate 80 is enabled.

The pulse on branch *42a* is applied through transistor *41a* to set flip-flop 82. This flip-flop was also reset by control pulse CP–3 of the previous cycle. Set flip-flop 82 enables AND gate 48.

The next control pulse CP–2 applied to terminal 84 passes through AND gate 48 producing an output at lead 50. This output goes via branch *52b* to primed AND gate *54b*. The output of AND gate *54b* serves as an input to AND gate *58c*. The other two inputs to AND gates *58c*, namely CP–2 and the 1 output of flip-flop *36c*, are also "ones" so that AND gate *58c* conducts and produces an output $E_3$. $E_3$ is applied through OR gate 58 to produce the enabling signal E for the sense amplifiers 20 of FIGURE 2. The $E_3$ pulse is concurrently applied to the row 3 line 73 so that the sense amplifiers 20 readout the binary word 0 1 0 0 0 which is stored in row 3. The $E_3$ pulse also resets flip-flop *36c*, erasing the information stored in the flip-flop.

During the next cycle, there is no longer any information stored in flip-flops 32 or 36. Therefore the CP–1 pulse does not cause any of the succeeding flip-flops, namely 44, *44a* and 82, which were reset by pulse CP–3, to become set. This means that AND gate 48 is not primed and pulse CP–2 cannot pass through this gate to the divergent tree network. The inverter 90, however, produces a "1" output and primes AND gate 92. When the CP–2 pulse occurs, it enables primed AND gate 92 and the stop signal ST is produced. This stop signal may be employed to start a new memory readout cycle which may include applying a new tag word to the memory and then reading out the words in the memory corresponding to the new tag word.

The convergent and divergent tree networks of the present invention have been illustrated as tree networks in which two branches merge into one branch and vice versa. It is to be understood that the tree networks are not limited to this particular configuration. For example, the convergent tree network of FIGURE 3 can have three or four branches converge into a single branch, and vice versa for the divergent tree network. It is also to be understood that storage devices other than flip-flops may be used to sense the presence or absence of a signal in the convergent tree and applying an enabling or disabling signal to the divergent tree. For example, magnetic cores may be used with suitable timing pulses to produced priming or disabling signals, respectively, during the time the pulse is passing along the divergent tree network.

It is also to be understood that modifications of the divergent-convergent tree network of FIGURE 3 are possible. For example, in the arrangement of FIGURE 5, which shows only a portion of the divergent and convergent trees, AND gates 340 are substituted for the pulse circuits 34 and AND gates 620 are substituted for the pulse circuits 62. Also, the timing of the networks is altered slightly from that of the network of FIGURE 3.

Figure 5:
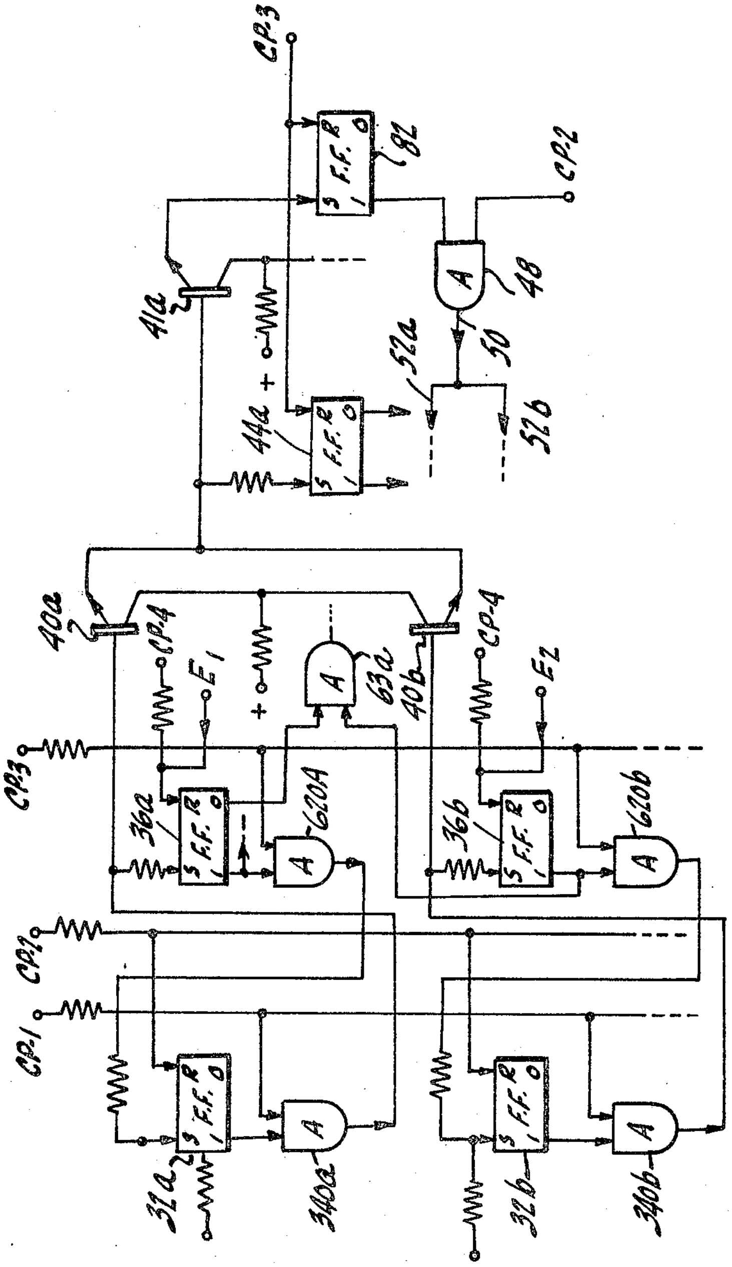
FIGURE 5 is a block and schematic circuit diagram of a portion of a modified form of a divergent and convergent tree network.

In the operation of the network of FIGURE 5, in response to the start pulse, information is temporarily stored in the flip-flops 32. The clock pulse CP–1 causes the AND gates 340 to apply the information stored in the flip-flops 32 to the inputs to the convergent tree network and to the set terminals of the flip-flops 36. The clock pulse CP–2 is applied also to the input AND gate 48 of the divergent tree network. It also resets the flip-flops 32.

As in the embodiment of FIGURE 3, during the interval of clock pulse CP–2, one of the E pulses is generated. This $E_2$ pulse resets one of the flip-flops 36 erasing the information stored there, and is applied also as an E pulse to the row corresponding to that flip-flop. Also as in the embodiment of FIGURE 3, the E pulse enables the sense amplifiers of FIGURE 2.

The clock pulse CP–3 returns the information remaining temporarily stored in flip-flops 36 to the flip-flops 32. The clock pulse CP–4 resets the flip-flops 36 completing one read cycle.

In other respects, the operation of the circuit of FIGURE 5 is the same as that of FIGURE 3 and need not be discussed in detail. Only so much of the circuit is shown in FIGURE 5 as is necessary to follow the operation. The remainder of the circuit, except for the substitution of AND gates such as 340 and 620 for the pulse circuits, is the same as the circuit of FIG. 3.

To summarize the invention, a plurality of binary bits are applied in parallel to an input to a network. Some of the bits represent the binary digit "1" and others the binary digit "0." The network produces time sequential pulses at its output indicative of the number of "ones" in the parallel input bits. The input terminals are 71–74 in FIGURE 3. The output terminal is 94, that is, the terminal at which the E pulses appear. The detailed description above shows how this idea is applied to the problem of reading out, in sequence, the words in a content addressed memory corresponding to a tag word applied to the memory. Note that the words are read out in the order in which they appear in the memory.

There are many other uses in a data processing system for an arrangement of the type described. For example, it may be used in any place in the data processing system where it is desired quickly to count the number of ones in a parallel binary word. One example is in problems in which it is desired to determine statistical distributions. The saving of time is especially great in cases in which there are only a relatively small number of ones in a word containing a relatively large number of bits. The number of read cycles required to read the number of ones in a word using the present system is equal to the number of ones in the word, regardless of the length of the word.

The invention may also be used to advantage in connection with fast arithmetic operations. For example, in fast multiplication it is desired to locate the positions of the ones in the multiplier. The present invention enables this to be done directly and in a very short time.

Still another example of where the invention may be used is in connection with non-permanent content addressed memories where the problem is that of determining an empty storage location into which a word may be written. A content addressed memory of this type may be modified according to the teachings of the present invention by assigning to each word storage location an additional bit that is given the valve zero when the storage location is full, and the value one when the storage location is empty. When it is desired to write a word into such a memory the system of the present invention senses all word locations and determines the first location which is empty. This location that may be primed so that an input word may be read only into this location.

What is claimed is:

1. In combination, a plurality of storage devices for storing, in parallel, the bits of a binary word; a first network connected to said storage devices for concurrently sensing all bits stored; a second network responsive to the first network for producing one output pulse in response to the storage by any of the devices of a binary bit of given value, and for removing that binary bit from only one of said devices; and means for causing the first and second networks to repeat their function until the binary bit of given value has been removed from all of said devices.

2. In combination, a plurality of storage devices for storing, in parallel, the bits of a binary word; a convergent tree, first network connected to said storage devices for sensing all bits stored; a divergent tree, second network responsive to the first network for producing one output pulse in response to the storage by any of the devices of a binary bit of given value, and for removing that binary bit from only one of said devices; and means for causing the first and second networks to repeat their function until the binary bit of given value has been removed from all of said devices.

3. In combination:

(a) a plurality of storage devices for storing, in parallel, the bits of a binary word;

(b) a first multiple path network, including signal responsive means in each said path for producing control signals, connected to said storage devices for sensing all bits stored;

(c) a second multiple path network, including gate means in each said path responsive to said control signals, for producing one output pulse in response to the storage by any of the devices of a binary bit of given value, and for removing that binary bit from only one of said devices; and (d) means for causing the first and second networks to repeat their function each time a binary bit of said given value is removed from one of said devices until the binary bit of given value has been removed from all of said devices.

4. In combination:

(a) a plurality of two state storage devices for storing, in parallel, the bits of a binary word;

(b) a first multiple path network, including means in each said path for producing a control signal in response to a binary bit of given value stored in a storage device, connected to said storage devices;

(c) a second multiple path network, including gate means in each of its paths responsive to said control signals, coupled to said first network for producing one output pulse in response to the storage by any of the devices of a binary bit of said given value, and for removing that binary bit from only one of said devices;

(d) and means for causing the first and second networks to repeat their function each time a binary bit of said given value is removed from one of said devices until the binary bit of given value has been removed from all of said devices.

5. In combination:

(a) N storage devices for storing, in parallel, the N bits of a binary word;

(b) a convergent tree network having N input branches, one connected to each said storage device, for producing control signals in response to binary bits of given value stored in said devices;

(c) a divergent tree network including N output branches, one connected to each said storage device, said divergent tree network including means responsive to said control signals for disabling all paths through said divergent tree network except one, said one path leading solely to one of said N output branches and said one branch leading to a storage device which stores a binary bit of said given value;

(d) means coupled to said divergent tree network for applying a signal thereto for application through said one enabled path to both erase the binary bit stored in the storage device connected to said path and to produce an output signal;

(e) and means for causing said convergent and divergent tree networks to repeat their function until all of the N storage devices which store said binary bit of given value have been erased.

6. In combination:

(a) a content addressed memory arranged having M columns and N rows;

(b) means for applying a tag word to at least some of the columns of the memory for producing outputs at Q of the N rows of the memory;

(c) N temporary storage devices, one connected to each row, Q of which are for storing said Q outputs as Q binary bits of given value;

(d) a convergent tree network having N input branches, one connected to each said storage device, for producing control signals in response to the binary bits stored in said devices;

(e) a divergent tree network including N output branches, one connected to each said storage device, said divergent tree network including means responsive to said control signals for disabling all except a single path through said divergent tree network, said single path leading solely to one of the N output branches to a storage device which stores a binary bit of said given value;

(f) means coupled to said divergent tree network for applying a signal thereto for application through said enabled path to both erase the binary bit stored in the storage device connected to said path and to produce an output signal;

(g) and means for causing said convergent and divergent tree networks to repeat their function until all of the N storage devices which store said binary bit of given value have been erased.

7. In combination, a content addressed memory; means for applying a tag word to the memory; means coupled to the memory for concurrently sensing the number $q$ of words in the memory corresponding to said tag word; and means coupled to the memory for reading out said words in $q$ read cycles of the memory.

8. In combination, a content addressed memory arranged in columns and rows and which stores $q$ words corresponding to a tag word in $q$ rows of the memory; means coupled to the rows of the memory for concurrently sensing the $q$ rows in the memory storing words corresponding to a tag word; and means coupled to the last-named means and to the columns of the memory for reading out said $q$ rows, in sequence, in $q$ read cycles, in response to the last-named means.

9. In combination, a content addressed memory arranged in columns and rows and which stores $q$ words corresponding to a tag word in $q$ rows of the memory; a multiple path logic network coupled to the rows of the memory and responsive to timing pulses for concurrently sensing signals on the $q$ rows in the memory storing words corresponding to a tag word for producing control pulses; and means coupled to said logic network and to the columns of the memory and responsive to certain of said control pulses for reading out said $q$ rows, in sequence, in $q$ read cycles.

References Cited by the Examiner

UNITED STATES PATENTS

| | | | |
|---|---|---|---|
| 2,781,447 | 2/1957 | Lester | 250—27 |
| 2,951,230 | 8/1960 | Cadden | 340—168 |
| 3,031,650 | 4/1962 | Koerner | 340—174 |
| 3,061,192 | 10/1962 | Terzian | 235—157 |
| 3,191,155 | 6/1965 | Seeber et al. | 340—172.5 |
| 3,199,082 | 7/1965 | Haibt | 340—172.5 |

OTHER REFERENCES

Kiseda, Peterson, Seelbach, and Teig: A Magnetic Associative Memory, April 1961, IBM Journal, pages 106–121, pages 109, 115–118 relied upon.

ROBERT C. BAILEY, *Primary Examiner.*

MALCOLM A. MORRISON, *Examiner.*

R. M. RICKERT, *Assistant Examiner.*